United States Patent [19]

Walton, II et al.

[11] 4,240,204
[45] Dec. 23, 1980

[54] JIG SAW

[75] Inventors: Richard E. Walton, II, Fallston; William D. Sauerwein, Joppa, both of Md.

[73] Assignee: Black & Decker Inc., Newark, Del.

[21] Appl. No.: 50,042

[22] Filed: Jun. 19, 1979

[51] Int. Cl.³ .................. B23D 49/00; B27B 11/00
[52] U.S. Cl. ........................................ 30/393; 83/776
[58] Field of Search ................... 30/392, 393, 394; 83/758, 759, 776

[56] References Cited

U.S. PATENT DOCUMENTS 2,917,088  12/1959  Papworth ........................ 30/393
3,374,814  3/1968  Kaufmann ........................ 83/758

FOREIGN PATENT DOCUMENTS 2235862  1/1974  Fed. Rep. of Germany .

Primary Examiner—Jimmy C. Peters
Attorney, Agent, or Firm—Leonard Bloom; Edward D. Murphy; Harold Weinstein

[57] ABSTRACT

A portable electric jig saw incorporating an improved lightweight, one-piece saw blade carrier, and an improved floating three-point carrier guide arrangement. The invention is disclosed embodied in both non-orbital and adjustable orbit type jig saws.

18 Claims, 15 Drawing Figures

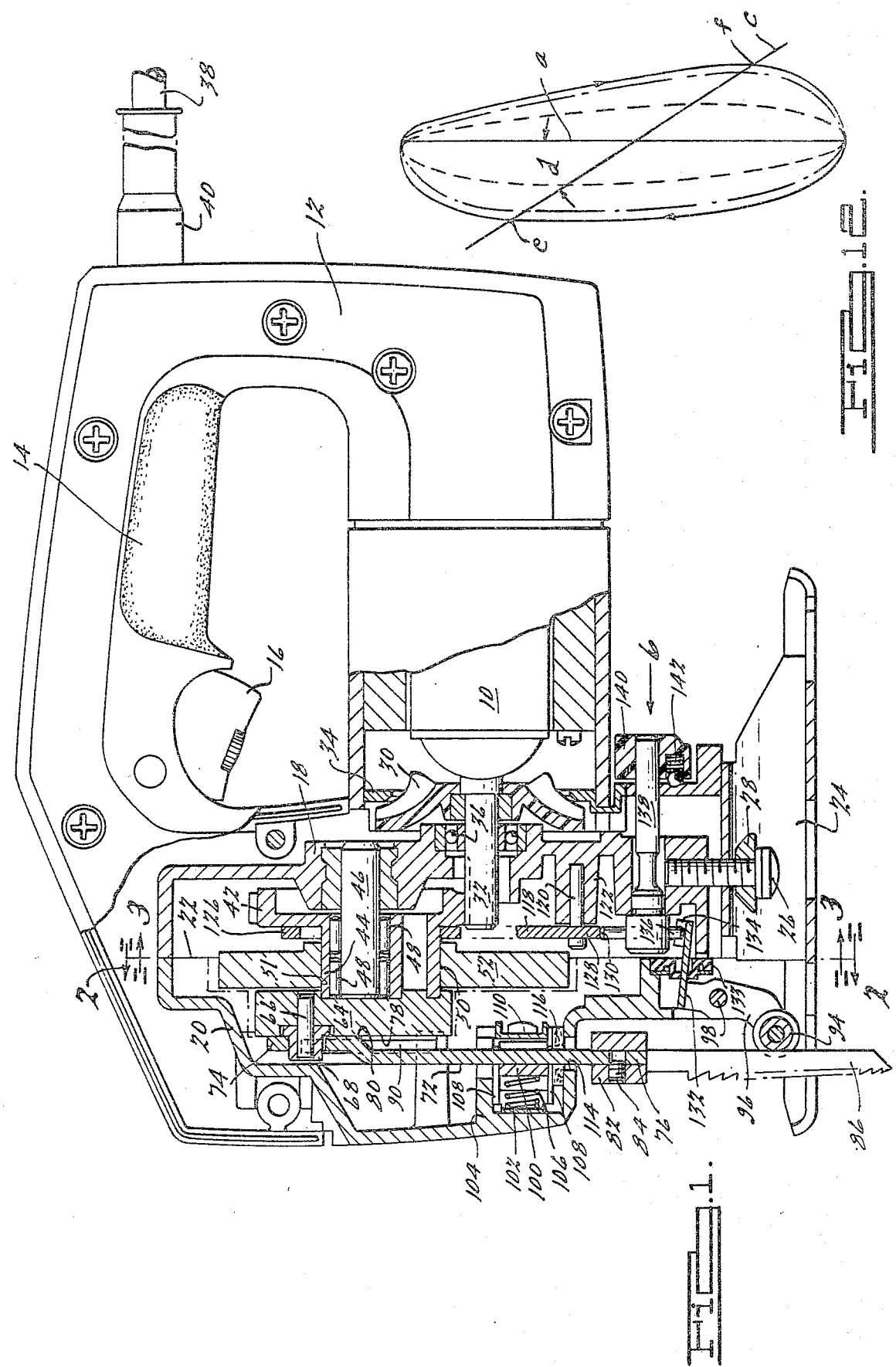

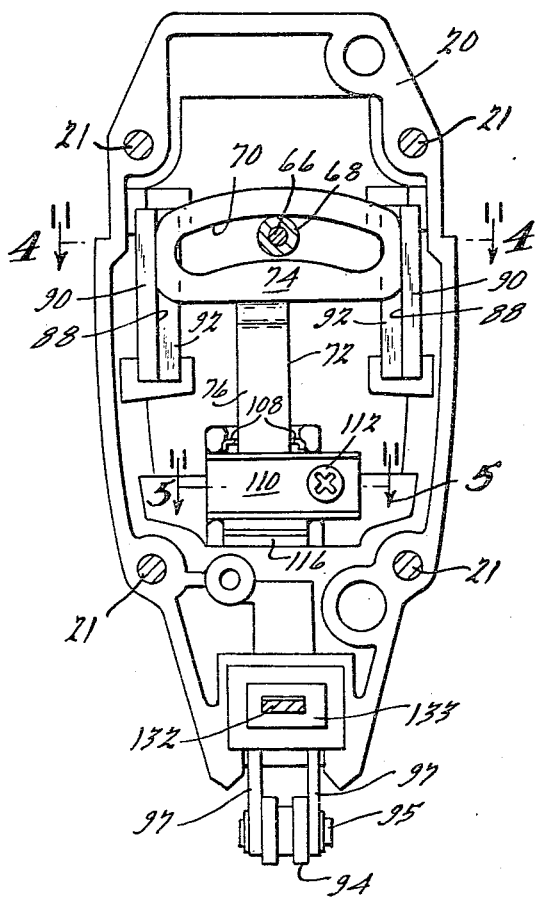
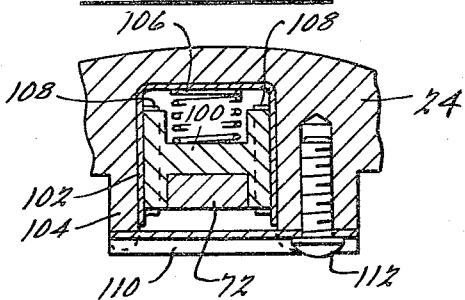
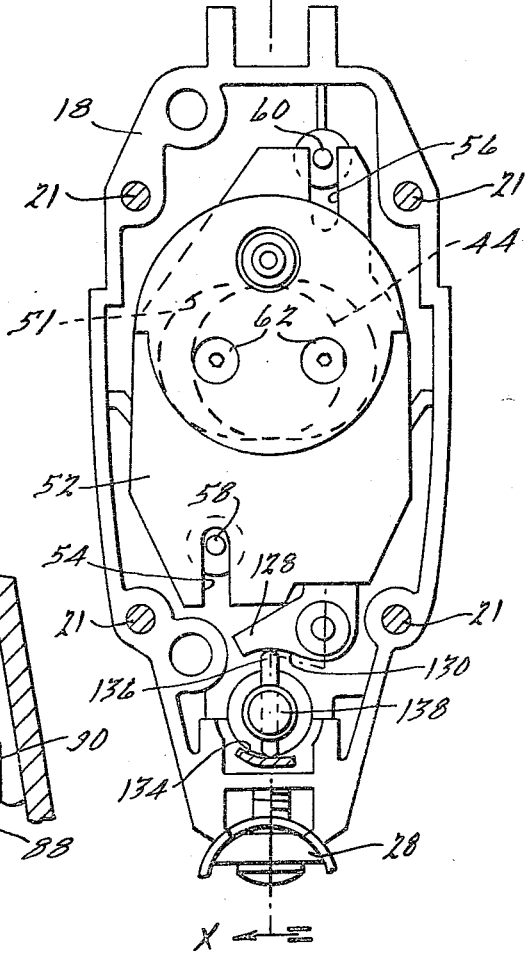

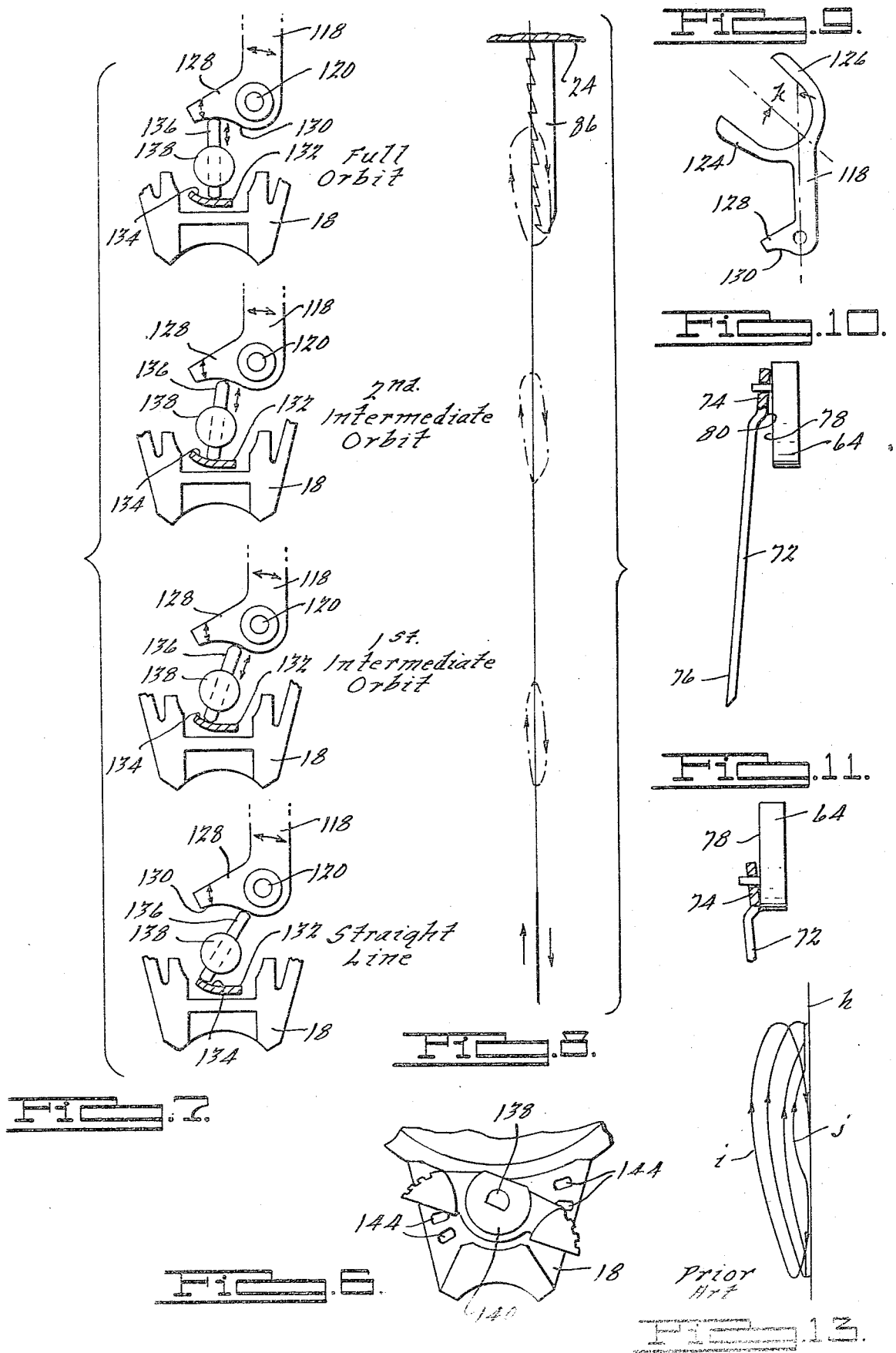

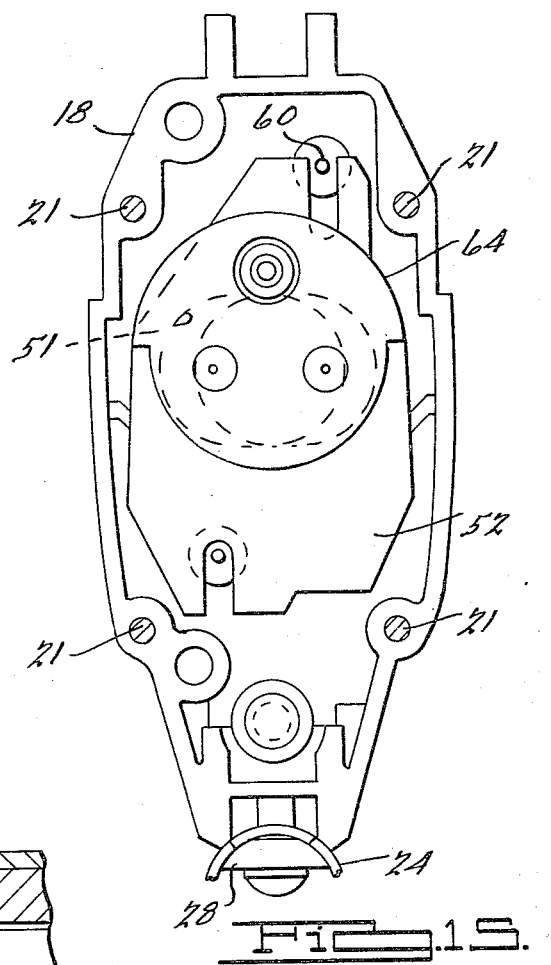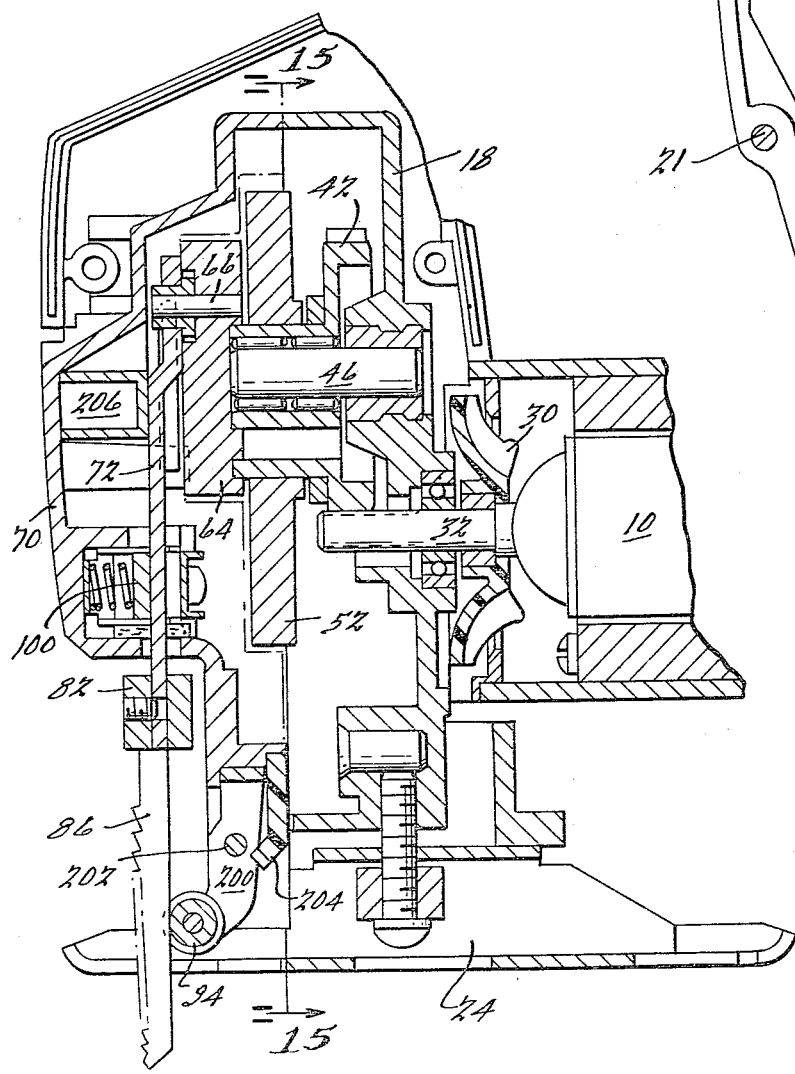

JIG SAW

BACKGROUND AND SUMMARY OF THE INVENTION

This invention relates to jig saws, and more particularly to portable electric jig saws of the type sometimes referred to as saber saws or bayonet saws.

Because jig saws of the present type are hand held by the operator, it is very important to provide as lightweight a mechanism as possible in order to reduce operator fatigue. Light weight is of particular significance with respect to the reciprocating or oscillating parts of the mechanism (such as the saw blade carrier) because excess weight in such parts causes excess vibration, and also requires excess counterbalancing which adds to overall weight.

Friction between the respective parts of the mechanism should also be minimized so that there is no excessive heat build-up, a major operator complaint. The saw blade support mechanisms of all jig saws are subject to a high twisting moment about the vertical axis of the blade due to the reacting forces exerted on the blade by the workpiece when the jig saw is being turned with respect to the workpiece. This twisting moment must be overcome by the blade support mechanism, but in many known mechanisms a substantial amount of undesirable frictional heat is created in the jig saw in accomplishing this.

A problem often encountered with non-orbital jig saws having a saw blade guide roller engaging the rearward edge of the blade, is that any misalignment between the carrier and roller in the fore-and-aft direction will cause the blade to be biased with respect to the carrier, which in turn can cause the blade to break, become loose and detach from the carrier, and/or damage the workpiece.

A primary object of the present invention resides in the provision of a portable jig saw ideally suited for heavy-duty professional use, yet which is relatively compact in size and light in weight, and which overcomes the aforementioned problems of known mechanisms.

Another object of the present invention resides in the provision of an improved lightweight, simple, one-piece saw blade carrier which is easy and inexpensive to manufacture, having minimum tolerance requirements. A related object concerns the provision of a unique three-point guide system for the saw blade carrier which renders the mechanism fully suitable for either non-orbital, orbital or adjustable orbit type jig saws, and automatically compensates for manufacturing tolerances while at all times providing a controlled guiding of the saw blade.

A further object of the present invention resides in the provision of an improved saw blade carrier and guide mechanism for non-orbital jig saws having a saw blade guide roller which significantly reduces the likelihood of blade breakage or detachment due to misalignment of the parts.

These and other objects, features and advantages of the present invention will become apparent from the subsequent description and the appended claims, taken in conjunction with the accompanying drawings.

BRIEF DESCRIPTION OF THE DRAWINGS

FIG. 1 is a side elevational view, partly in longitudinal section, illustrating an adjustable orbit type jig saw embodying the principles of the present invention;

FIG. 2 is a transverse sectional view taken along line 2—2 in FIG. 1;

FIG. 3 is a transverse sectional view taken along line 3—3 in FIG. 1;

FIG. 4 is an enlarged fragmentary horizontal sectional view taken generally along line 4—4 in FIG. 2;

FIG. 5 is an enlarged fragmentary horizontal sectional view taken generally along 5—5 in FIG. 2;

FIG. 6 is an enlarged fragmentary rear sectional view looking in the direction of arrow 6 in FIG. 1;

FIG. 7 is a diagrammatic illustration of a portion of the orbital drive means of the jig saw of FIG. 1 in several different positions thereof;

FIG. 8 is a diagrammatic illustration of the orbital path of the saw blade in the respective positions illustrated in FIG. 7;

FIG. 9 is an elevational view of one of the parts of the orbital drive means of the jig saw of FIG. 1;

FIGS. 10 and 11 are exaggerated diagrammatic views illustrating the range of movement of the saw blade carrier of the jig saw of FIG. 1 in the feed direction;

FIG. 12 is a diagrammatic illustration of the orbital path of movement of a single point on a saw blade powered by the orbital drive means of the jig saw of FIG. 1;

FIG. 13 is a view similar to FIG. 12, but illustrating the orbital path of a prior art mechanism;

FIG. 14 is a view similar to FIG. 1 but illustrating a non-orbit type jig saw embodying the principles of the present invention; and FIG. 15 is a view similar to FIG. 3 but directed to the embodiment of FIG. 14.

DESCRIPTION OF THE PREFERRED EMBODIMENTS

With reference to FIG. 1, the first embodiment of the present invention is conventional in overall layout, comprising an electric motor 10 (partly shown) disposed within and forming a part of an outer casing 12 in part defining a handle 14 from the lower surface of which projects a motor switch trigger 16. Disposed within the casing is a gear case 18 having a gear case over 20 affixed thereto by means of bolts 21 (FIGS. 2 and 3). The mating surfaces of case 18 and cover 20 are indicated at 22. A conventional shoe 24 is affixed to the bottom of gear case 18 by means of a clamping screw 26 and clamp washer 28 in the usual manner, permitting relative rotational movement between the body of the jig saw and the shoe about a longitudinally extending axis, thereby facilitating the cutting of bevelled edges. Cooling and chip removal are facilitated by means of a fan 30 affixed to shaft 32 of motor 10 operating in cooperation with a fan baffle 34. Motor shaft 32 is journalled in a ball bearing 36 mounted in the rear wall of gear case 18. Power is supplied to the jig saw via the usual power cord 38 passing through a cord protector 40 into casing 12.

Although the above structure is relatively conventional in jig saws of the present type, the saw blade drive mechanism and the orbital drive means of the present invention contain a number of unique features. The saw blade drive mechanism is of the scotch yoke type, comprising a gear 42 having a hub 44 journalled on a shaft 46 rigidly supported in the rear wall of gear case 18, gear 42 being supported by means of needle bearings 48 and in driving engagement with teeth formed on the forward end of motor shaft 32. Hub 44 has an eccentric cylindrical outer surface 50 slidably received within and drivingly engaging a transversely elongated opening 51 in a counterweight 52. As best shown in FIG. 3, counterweight 52 is provided with vertical slots 54 and 56 in which are slidably disposed pins 58 and 60, respectively, affixed to gear case 18, to insure that counterweight 52 moves only in a vertical direction, as illustrated. Rigidly affixed to the forward end of hub 44 by means of screws 62 is a generally circular crank plate 64 having an eccentrically located pin 66 having a roller bushing 68 rotationally disposed on the forward end thereof.

Roller bushing 68, which serves as a low friction crank pin, is drivingly disposed within an arcuate slot 70 (FIG. 2) of a generally vertically extending T-shaped saw blade carrier 72 having a transversely extending relatively flat upper head section 74 in which slot 70 is disposed and an offset generally parallel and flat lower section 76. Upper section 74 is adapted to slidingly engage a generally flat support surface 78 on the front face of crank plate 64. The transition between upper section 74 and lower section 76 of carrier 72 is defined by a shoulder 80 (FIGS. 1 and 10). A saw blade 86 is affixed to the lower end of blade carrier 72 by means of a blade chuck 82 retained in place by a set screw 84. Slot 70 has a vertical dimension slightly greater than the outside diameter of roller bushing 68 in order to accommodate fore-and-aft orbital movement of carrier 72, as shown in an exaggerated manner in FIGS. 10 and 11.

Unique means are provided for guiding the movement of blade carrier 72 to insure that its movement will be limited to reciprocation in a longitudinal plane with a limited degree of orbital movement in the feed direction when desired, but with substantially no rotation about a vertical axis. This is accomplished by utilizing a three-point guide means which permits the saw blade carrier to float in a fore-and-aft direction. Guiding is performed at the upper end of carrier 72 (first "point") by the engagement of carrier upper section 74 with support surface 78 and, in addition, by the engagement of the transverse edges of upper section 74 with inwardly directed vertical bearing surfaces 88 of a pair of guide bars 90 mounted in suitable shaped pockets in the front wall of gear case cover 20 in the manner best illustrated in FIGS. 2 and 4. Guide bars 90 also have rearwardly facing bearing surfaces 92 for the purpose of limiting forward movement of upper section 74 of blade carrier 72. As shown best in FIGS. 1 and 2, the lower end of the blade carrier and saw blade assembly (second "point") is guided by means of a slotted roller 94 rotationally mounted on a pin 95 carried on a pair of downwardly extending arms 97 forming part of a bell crank 96 pivotally mounted on gear case cover 20 by means of a pin 98. Slotted roller 94 rollingly engages the trailing edge of saw blade 86 in all operative positions thereof. This assembly is constantly biased into engagement with roller 94 and support surface 78 by means of an intermediate guide bearing (third "point") best illustrated in FIGS. 1, 2 and 5, comprising an H-shaped slide bearing 100 slidably disposed within a sheet metal cage 102 positioned in a suitably shaped opening in a boss 104 formed in the forward wall of gear case cover 20. Slide bearing 100 slidably engages the forward surface and side edges of blade carrier 72, and is mounted for sliding movement in a fore-and-aft direction. It is biased in a rearward direction against carrier 72 by means of a compression spring 106 disposed between the forward wall of cage 102 and the opposed surface of slide bearing 100. The lateral sides of cage 102 have inwardly directed flanges 108 at the upper and lower edges thereof FIGS. 2, 4 and 5) to retain slide bearing 100 in a vertical direction. The intermediate guide bearing is retained in place by means of a clamp bracket 110 retained against the rearward face of boss 104 by a threaded fastener 112.

In order to provide fore-and-aft orbital movement of the blade carrier adequate clearance is provided between the upper section 74 of carrier 72, support surface 78 and bearing surfaces 92, and an enlarged opening 114 is provided in gear case cover 20. Contaminants are prevented from entering the gear case through opening 114 by means of a laminated rubber and felt seal 116 which sealingly rides on the surface of blade carrier 72.

Because of the improved carrier guide means of the present invention, manufacturing tolerances are less critical and carrier 72 may be expensively fine blanked in one piece. This, along with the elimination of the usual upwardly extending stem for upper bearing purposes, significantly reduces the overall weight of the mechanism. In addition, clamp 82 may be relatively low mass because the side of carrier 72 may be used for one of the blade clamping surfaces. Furthermore, the relatively wide face on upper section 74 of carrier 72 reduces unit pressures on the frictional surfaces, thereby reducing overall friction, wear and heat, and increasing efficiency. This wide face (and the attendant large moment arm) also improves blade alignment and provides high resistance to rotation of the blade about a vertical axis.

As can be readily visualized, rotation of motor shaft 32 will impart a vertical oscillatory movement to counterweight 52 and rotation to crank plate 64, and the action of roller bushing 68 engaging the inside peripheral surface of slot 70 will cause vertical reciprocation of blade carrier 72 and saw blade 86 affixed thereto. To effect the desired counterbalancing of the respective parts, counterweight 52 moves 180 degrees out of phase with blade carrier 72, the mechanism shown in FIG. 1 illustrating the crank pin at its top dead-center position and the counterweight at its lowermost position.

Unique means are also provided for controlling the orbital movement of the saw blade in the first embodiment of the invention, comprising orbital drive means incorporating a fork 118 journalled to gear case 18 by means of a pin 120 supported by a boss 122 formed in the gear case. As best illustrated in FIGS. 1, 3 and 9, fork 118 has a pair of upwardly extending arms 124 and 126 drivingly engaging eccentric hub 44 and a generally transversely extending lower arm 128 having a driving cam surface 130 on the lower surface thereof (for purposes of illustration the longitudinal section of FIG. 1 is taken generally along line X—X in FIG. 3, insofar as fork 118 is concerned). Bell crank 96 contains an upper lever arm 132 which passes through a dust seal 133 into gear case 18, the rearward edge of lever arm 132 defining a driven cam surface 134 in generally opposed relationship to cam surface 130. Motion translating means in the form of a push rod 136 is disposed between and engages cam surfaces 130 and 134 in all operative positions thereof. Push rod 136 is slidably supported within a transverse aperture in a shaft 138 rotationally disposed within a suitably sized opening in the rearward wall of gear case 18. Cam surfaces 130 and 134 are generally circular in configuration and have a common center of curvature coincident with the rotational axis of shaft 138 (in the portion of the stroke shown). Rotation of shaft 138 therefore causes the ends of push rod 136 to traverse cam surfaces 130 and 134 while always remaining in engagement therewith, while push rod 136 moves axially in the transverse aperture in shaft 138. The rearward end of shaft 138 is provided with a manually operable orbit control knob 140 (FIGS. 1 and 6). A spring detent assembly 142 may be provided in knob 140 to cooperate with a plurality of recesses 144 in the outer rear surface of gear case 18 to provide optional predetermined rotational positions of shaft 138, and hence predetermined degrees of orbital movement (from full orbital to straight line). Infinite control within the limits of the mechanism may alternatively be provided by eliminating the detent assembly.

As will be readily visualized, when motor 10 is energized oscillations of hub 44 will cause fork 118 to oscillate about pin 120 to cause arm 128 to oscillate in a generally vertical direction. This movement of arm 128 is transmitted via push rod 136 to lever arm 132 of bell crank 96 to thereby cause roller 94 to move the blade carrier and saw blade assembly in a fore-and-aft direction, thereby providing an orbital movement of the blade when the latter is reciprocating. The geometry of the mechanism is such that roller 94 urges the saw blade in a forward or feed direction when the latter is on its upward sawing stroke and the bias of slide bearing 100 (plus the reaction force exerted by the workpiece resisting movement in the feed direction) moves it in the reverse direction as determined by the progressively rearward position of roller 94 on the downward stroke of the saw blade. At all times the saw blade is under positive guiding and driving control and there is no lost motion (other than normal manufacturing clearances) in either the blade drive mechanism or the orbit drive mechanism.

The range of orbital control provided in this embodiment is best illustrated in FIGS. 7 and 8. In the upper view in FIG. 7 the mechanism is illustrated in "full orbit" position in which maximum displacement of the saw blade in the fore-and-aft direction will occur. In this position push rod 136 is arranged with its center axis passing a substantial distance from the rotational axis of fork 118 at pin 120. Substantial oscillation is thereby imparted by fork 118 to push rod 136, which in turn transmits such motion to cam surface 134 on bell crank 96 to cause maximum oscillation of roller 94. FIGS. 10 and 11 show in exaggerated form the corresponding range of movement of carrier 72 with respect to support surface 78. Because of the offset in carrier 72 it is free to rock on support surface 78 with either the upper edge thereof or shoulder 80 thereof engaging surface 78, which in conjunction with guide bars 90 fully guides the upper end of the carrier. The bias of intermediate guide bearing 100 maintains carrier 72 in engagement with support surface 78 and the blade in engagement with guide roller 94. This overall arrangement eliminates the need for the usual upwardly extending stem on the carrier for support by an upper bearing, thereby providing a significant weight reduction.

In the lower view in FIG. 7 shaft 138 has been rotated to move push rod 136 so that its center axis is in line with the pivotal axis of fork 118. In this position, oscillation of fork 118 will impart no movement to push rod 136. Roller 94 consequently will not oscillate and the saw blade will reciprocate on a straight line path. The intermediate views in FIG. 7 illustrate intermediate orbital positions of the mechanism, and as can be readily visualized provide intermediate degrees of orbital movement. The orbital path defined by a single point on the saw blade during a complete cycle for each such position thereof is generally illustrated in FIG. 8, with each of the views thereof being aligned with the corresponding orbital position in FIG. 7.

The best overall view of applicant's orbital path is formed in FIG. 12, wherein three degrees of orbital movement are shown. The vertical axis of the jig saw (as shown in its horizontal position) is indicated at a, and it is along this axis that the saw blade reciprocates when in its non-orbiting or straight line position. The outer contour (solid line) illustrates the orbital path of the saw blade when in the full orbital position, and the intermediate dashed lines illustrate intermediate orbital positions. As can be seen, all orbital paths are generally continuous and uninterrupted. Because of the pendular movement of the saw blade carrier there is greater fore-and-aft displacement of the saw blade at the lower portion of its path than there is at the upper portion thereof. Furthermore, the orbital drive mechanism is arranged to provide a forward motion of the saw blade for the major part of its upward cutting stroke. As can be seen, the orbital saw blade path is contoured so that the saw blade is moving forward (i.e., in the feed direction) from the bottom of its path up to point e, which is approximately 70% of its total stroke. This is achieved by canting fork 118 (FIG. 9). If fork 118 was formed without a cant, the orbital path would be truly symmetrical about axis a; however, by providing a cant, such as indicated by angle k in FIG. 9, the orbital drive means is "phased" so that the orbital path is distorted in the manner shown in FIG. 12 to provide forward blade movement for a greater portion of the cutting stroke. Axis c in FIG. 12 is canted with respect to axis a by an amount equal to angle d, which represents the phase shift caused by the cant of fork 118. Accordingly, the point of intersection of axis c and the full orbital path, indicated at e, is the maximum forward position of the saw blade in a given cycle. Conversely, point f is the most rearward point of the saw blade movement on its return stroke. The intersection of any intermediate orbital path of the saw blade with axis c represents the maximum displacement position of the saw blade (with respect to axis a) for that degree of orbital movement. It is significant that the saw blade moves rearwardly of axis a on its return stroke (and in a rearward direction for the major portion of such stroke) because this action facilitates the release of wood chips, etc. from the saw blade. The smooth, uninterrupted orbital movement of applicant's saw blade may be contrasted with that of a typical prior art lost motion type mechanism, such as shown in FIG. 13. Note that the full orbit path, indicated at i is displaced wholly on one side of the straight line path which occurs along axis h, thus impairing wood chip removal; and that a partial orbit path, such as indicated at j, is not smooth and interrupted but has a distinct "bump" in it which will cause the saw blade to impact the workpiece.

Unlike many prior designs, this mechanism obtains an adjustable degree of orbital movement without introducing lost motion into the system; it varies the orbit by changing the mechanical advantage of the system, not by interrupting movement. Another significant advantage of this embodiment is that the orbital movement of the blade, regardless of the degree thereof, is always disposed on opposite sides of the straight line path thereof (i.e., the non-orbital path) on its cutting and return strokes, respectively. This is very desirable because it maximizes use of all the teeth of the saw blade throughout most of its cutting stroke, as distinguished from many known mechanisms which merely interrupt the orbital path of the saw blade to reduce the degree of orbital movement, and because it facilitates chip removal.

The embodiment of FIGS. 14 and 15 is generally similar to that illustrated in the preceding figures, with the primary exception being that the jig saw of the second embodiment does not have any orbital drive means. Like reference numerals are used in FIGS. 14 and 15 to indicate parts which are similar to those described in connection with the preceding embodiment. Other than the absence of orbital drive means, this embodiment differs from the first one in that slotted roller 94 is supported by a bell crank 200 which is rigidly affixed to gear case cover 20 by means of a fastener 202. The roller 94 thus provides a fixed back-up or guide for saw blade 86. Dust seal 133 is replaced in this embodiment by a plate 204 which provides a closure to the interior of the casing. In addition, an oiler felt 206 is provided between blade carrier 72 and the front of cover plate 20 to provide requisite lubrication. A similar oil felt may be provided in the embodiment of FIGS. 1–13.

There are a number of distinct advantages in providing a floating saw blade carrier support arrangement, in addition to the minimization of many manufacturing tolerances. For example, in a rigid carrier system, if the carrier is positioned too far forwardly or too far rearwardly with respect to roller 94 the saw blade (by virtue of its rolling engagement with roller 94) will be caused to "wiggle" in the chuck, thereby possibly working itself loose, or it may bind and break and possibly even damage the workpiece. Also, this misalignment may cause the saw teeth to move toward or away from the workpiece, which will reduce the cutting rate and cause premature blade wear.

Thus, there is disclosed in the above description and in the drawings two embodiments of an improved jig saw which fully and effectively accomplish the objectives thereof. However, it will be apparent that variations and modifications of the disclosed embodiments may be made without departing from the principles of the invention or the scope of the appended claims.

We claim:
1. A drive mechanism for a jig saw, comprising:
  a casing having a motor horizontally disposed therein;
  a generally vertically disposed saw blade carrier vertically reciprocable by said motor and having means at its lower end for attaching a saw blade;
  means defining an upper carrier support comprising a support surface in said casing slidingly engaged by the upper portion of said saw blade carrier;
  means defining a lower carrier support comprising a saw blade guide attached to said casing and positioned to engage the trailing edge of a reciprocating saw blade attached to said saw blade carrier;
  means defining an intermediate carrier support comprising guide means in said housing for biasing said saw blade carrier toward said support surface and a saw blade attached to said carrier against said saw blade guide, whereby said support surface and said saw blade guide determine the reciprocal axis of said saw blade carrier and saw blade;
  a rotary crank plate drivingly connected to said motor; and
  said support surface being disposed on said crank plate.

2. A drive mechanism as claimed in claim 1, further comprising an eccentrically disposed crank pin affixed to said crank plate and projecting outwardly from said support surface, and means defining an aperture in said upper portion of said saw blade carrier, said crank pin being drivingly disposed therein.

3. A drive mechanism as claimed in claim 1, wherein said upper portion of said saw blade carrier includes a transversely extending head portion, and further comprising a pair of transversely spaced guide surfaces in said casing adapted to engage the transverse ends of said head portion to prevent transverse movement thereof.

4. A drive mechanism as claimed in claim 3, wherein said upper carrier support for the upper portion of said saw blade carrier includes a pair of guide bars, and said guide bars cooperate with said support surface to prevent rotation of said saw blade carrier about a vertical axis.

5. A drive mechanism for a jig saw comprising:
  a casing having a motor disposed therein;
  a rotary crank plate drivingly connected to said motor and having a relatively flat support surface disposed in a plane perpendicular to the axis of rotation thereof;
  an eccentrically disposed crank pin affixed to said crank plate;
  a saw blade carrier having a head end with an aperture therethrough in which said crank pin is drivingly disposed, and means at the opposite end for attaching a saw blade,
    said head end of said saw blade carrier being in engagement with and positioned by said support surface;
  a saw blade guide attached to said casing and positioned to engage the trailing edge of a reciprocating saw blade attached to said saw blade carrier; and
  guide means in said casing for biasing said saw blade carrier toward said support surface and a saw blade attached to said saw blade carrier toward said saw blade guide, whereby said support surface and saw blade guide determine the reciprocal axis of said saw blade carrier and saw blade.

6. A drive mechanism as claimed in claim 5, wherein the location of said head end of said saw blade carrier in one direction is determined solely by said support surface.

7. A drive mechanism as claimed in claim 5, wherein said head end is offset from the remainder of said saw blade carrier in a direction toward said support surface.

8. A drive mechanism as claimed in claim 7, wherein the boundaries of said head end along the axis of said carrier and are substantially equally spaced from said aperture.

9. A drive mechanism as claimed in claim 8, wherein said crank pin projects from said support surface and is spaced from the closest edge thereof a distance greater than the distance said aperture is spaced from each of said boundaries.

10. A drive mechanism as claimed in claim 9, wherein said support surface is generally circular, having a center of curvature coincident with said axis of rotation.

11. A drive mechanism as claimed in claim 5, further comprising orbit drive means for oscillating said saw blade carrier and a saw blade attached thereto in a feed direction.

12. A drive mechanism as claimed in claim 11, wherein said saw blade guide is oscillated by said orbit drive means to cause said saw blade carrier and saw blade to oscillate in a feed direction.

13. A drive mechanism as claimed in claim 5, wherein said saw blade guide is ridigly attached to said casing.

14. A drive mechanism for a jig saw comprising:
a casing having a motor disposed therein;
a rotary crank plate drivingly connected to said motor and having a relatively flat support surface disposed in a plane perpendicular to the axis of rotation thereof;
an eccentrically disposed crank pin affixed to said crank plate and projecting outwardly from said support surface;
an elongated saw blade carrier having a head end with an aperture therethrough in which said crank pin is drivingly disposed and an opposite end for attaching a saw blade,
said aperture being larger than said crank pin and said head end being offset from the remainder of said saw blade carrier in a direction toward said support surface,
said blade carrier being rockable in a fore-and-aft direction with said head end engaging said support surface; and
guide means in said casing for biasing said saw blade carrier toward said support surface in all positions of said carrier.

15. A drive mechanism for a jig saw comprising:
a casing having a motor disposed therein;
a rotary crank plate drivingly connected to said motor and having a relatively flat support surface disposed in a plane perpendicular to the axis of rotation thereof;
an eccentrically disposed crank pin affixed to said crank plate and projecting outwardly from said support surface;
an elongated saw blade carrier having an enlarged head end with an aperture therethrough in which said crank pin is drivingly disposed and an opposite end for attaching a saw blade,
said aperture being larger than said crank pin and said head being offset axially from the remainder of said saw blade carrier in a direction toward said support surface,
said blade carrier being rockable in a fore-and-aft direction with said head end engaging said support surface;
a pair of transversely spaced guide surfaces in said casing engaging the transverse sides of said head end of said saw blade carrier for limiting transverse movement thereof;
a pair of transversely spaced bearing surfaces in said casing disposed in opposed relationship with respect to said support surface,
said bearing surfaces and said support surface having said head end of said saw blade carrier disposed therebetween and cooperating with one another to limit rotation of said saw blade carrier about its own axis;
a saw blade guide attached to said casing and positioned to engage the trailing edge of a reciprocating saw blade attached to said saw blade carrier; and
guide means in said casing for biasing said saw blade carrier toward said support surface and a saw blade attached to said saw blade carrier toward said saw blade guide,
whereby said support surface and saw blade guide determine the reciprocal axis of said saw blade carrier and saw blade.

16. The drive mechanism of claim 15, wherein said blade guide is movably connected to said casing, and further comprising motor driven orbital drive means for oscillating said blade guide to cause the reciprocating blade engaged thereby to move in an orbital path.

17. The drive mechanism of claim 15, wherein said blade guide is rigidly fixed to said casing and said rocking of said blade carrier accommodates varying toleranced manufacturing dimensions of the parts of the mechanism.

18. The drive mechanism of claim 15, wherein said saw blade carrier is generally T-shaped in configuration with the head end extending generally horizontally and said opposite end extending generally vertically, said opposite end being offset transversely from the center vertical axis of said saw blade carrier.

* * * * *